UNITED STATES PATENT OFFICE.

JAMES B. GARNER, OF PITTSBURGH, PENNSYLVANIA, ASSIGNOR TO METALS RESEARCH COMPANY, OF NEW YORK, N. Y., A CORPORATION OF MAINE.

ABSORBENT MATERIAL AND PROCESS OF PRODUCING THE SAME.

1,262,770.  Specification of Letters Patent.  Patented Apr. 16, 1918.

No Drawing.  Application filed June 30, 1915.  Serial No. 37,320.

*To all whom it may concern:*

Be it known that I, JAMES B. GARNER, a citizen of the United States, residing in the city of Pittsburgh, county of Allegheny, and State of Pennsylvania, have invented certain new and useful Improvements in Absorbent Materials and Processes of Producing the Same; and I do hereby declare the following to be a full, clear, and exact description of the invention, such as will enable others skilled in the to art to which it appertains to make and use the same.

The present invention relates to an absorbent material having particularly valuable absorptive properties, and to processes of producing such material.

The invention is based upon the discovery that vegetable charcoal, when subjected to heating under a high vacuum for a suitable period of time is freed from injurious volatile constituents normally present, and which exert a prejudicial influence when the charcoal is used as an absorbent or catalytic material.

I have found that such constituents can be removed in a particularly advantageous manner by the process of the present invention, and that the resulting charcoal is, by this process, not only freed from such constituents with substantial completeness, but is itself converted into a particularly valuable condition for absorptive purposes.

The process of the present invention is particularly valuable in connection with vegetable charcoals, and will be described more in detail in connection therewith.

As vegetable charcoals, I may use the usual wood charcoals of commerce, as well as charcoals from other woods which are available for charcoal manufacture.

For use as absorbent arresters of sulfur dioxid, I have found that box wood charcoal has apparently the highest degree of absorptive capacity, it being capable of taking up as high as 30% by weight of sulfur dioxid. Among other charcoals which I have found to give good results are those produced from conifers such as pine, and spruce wood. It will accordingly be understood that the invention is of general application to the treatment of wood charcoal and that the kind of wood selected, or the kind of wood charcoal selected, will depend upon local considerations as to availability, cost and the like.

If the charcoal is already available, produced by the familiar methods of production, I subject it to heating, under such conditions as to drive off, as far as possible, any occluded gases or volatile constituents normally present of a character which, if left in the charcoal, would exert a prejudicial influence when used as an absorbent, *e. g.* such constituents as would tend to deposit elemental sulfur within the charcoal upon the absorption thereby and the removal therefrom of sulfur dioxid, and such as would thus materially decrease the absorptive power of the charcoal when subsequently used for further absorption.

In the case of ordinary charcoal, produced by familiar methods of manufacture, I may, according to the present invention, subject it to the following method:

In the case of ordinary charcoal, obtained say from pine wood, or spruce wood, the charcoal is heated in a closed oven in an inert atmosphere for a period of time which I prefer shall be about five hours, and at a temperature ranging from 250° C. to 275° C. An atmosphere sufficiently inert is obtained if the oven is well filled with charcoal and is tightly closed. It is then permitted to cool to atmospheric temperatures, before removal from the oven, whereafter it is heated in a closed receptacle, under a pressure lower than atmospheric pressure—preferably a pressure of 7 to 17 millimeters of the mercury column for say one-half hour, at a temperature of from 100° C. to 125° C. whereupon it is permitted to cool for one-half hour under this pressure, down to atmospheric temperatures, or lower, and is then ready for use. Under these conditions, the charcoal is freed from injurious volatile constituents normally present, which exert a prejudicial influence when the charcoal is used as an absorbent or catalytic material, and there is produced a charcoal product of particularly valuable properties for absorptive and absorptive purposes.

The procedure described involves heating the charcoal under a greatly diminished pressure, approximating a perfect vacuum, at a sufficient temperature and for a sufficient period of time to remove therefrom the injurious constituents of a volatile character removable by such treatment. According to the process above described, the charcoal is given a preliminary treatment at a somewhat higher temperature, either as an incident to its preparation, or subsequent thereto, but the charcoal is maintained in an inert atmosphere. In the subsequent heating the charcoal is heated in an exhausted receptacle and the cooling thereafter is also effected under a diminished pressure. The charcoal is thus protected during its cooling from the injurious infusion of oxidation or of other reaction which might tend to change its character or prejudice its absorptive properties.

In this connection, I may also say that, in the preparation of any particular charcoal I have found it to be generally true that the lower the pressure under which it is heated, the more effective and efficient is the charcoal obtained, under like conditions of temperature and duration of heating. I have also observed that with different charcoals the time required for driving off the prejudicial occluded gases and volatile ingredients varies somewhat, and it will be understood therefore that I do not limit myself to the exact temperatures or pressures stated, inasmuch as they may be varied, sometimes within a considerable range, in accordance with the particular character of the charcoal treated.

Where the charcoal is produced immediately before use, the treatment according to the present invention may be incorporated as a part of the charcoal production, or as a step immediately following such production, as indicated above under the second method described.

The charcoal produced as above described is of particular value as an absorbing arrester for sulfur dioxid, according to the method more fully described and claimed in my prior application, Serial No. 875,241, filed December 3, 1914. As more fully pointed out in said prior application, charcoal which is freed from such prejudicial constituents, according to the present invention, can be used as an absorbent of sulfur dioxid without any injurious separation of elemental sulfur therein. Accordingly, the sulfur dioxid can be recovered substantially quantitatively and the charcoal repeatedly used for further carrying on of the process. The total amount of sulfur dioxid taken up by the charcoal may vary from about 10 per cent. by weight to 30 per cent. by weight, according to the nature and properties of the charcoal selected.

The products resulting from the process above described may be generally characterized as carbonaceous materials of an absorbent nature, substantially free from volatile constituents which are capable of being removed by prolonged heating under a high vacuum, in the manner already described. This material is also cooled under a greatly reduced pressure, as already pointed out, and the resulting material accordingly has the properties characteristic of both the heating and the cooling procedure to which it is subjected. The more important applications of the invention to vegetable charcoal have already been pointed out.

While I have described certain important and specific applications of the invention, yet it will be understood that variations and modifications can be made therein without departing from its spirit and scope as set forth in the accompanying claims.

What I claim is:

1. The method of treating wood charcoal which comprises heating the same in an inert atmosphere for a prolonged period of time to a temperature of about 250 to 275° C., and subsequently heating the charcoal under a greatly reduced pressure and at a temperature of about 100 to 125° C. for a sufficient time to effect substantially complete removal of occluded gases and volatile ingredients therefrom, substantially as described.

2. The method of treating wood charcoal which comprises heating the same in an inert atmosphere for a prolonged period of time to a temperature of about 250 to 275° C., subsequently heating in an exhausted receptacle under a greatly reduced pressure to a temperature of about 100 to 125° C., for a period of about half an hour, and then cooling while still maintained under a greatly reduced pressure; substantially as described.

3. The method of treating wood charcoal which comprises heating the same in an inert atmosphere at a temperature of about 250 to 275° C. for a period of about five hours, cooling before removal from the receptacle or oven in which the heating takes place, subsequently heating the charcoal in a closed receptacle under a pressure of about 7 to 17 m. m. at a temperature of about 100 to 125° C. and for a period of about half an hour, and finally cooling the charcoal while still maintained under a high degree of vacuum; substantially as described.

In testimony whereof I affix my signature.

JAMES B. GARNER.